F. J. CHAPSAL & A. L. E. SAILLOT.
DEVICE FOR ACCELERATING THE APPLICATION OF PNEUMATIC BRAKES.
APPLICATION FILED JUNE 26, 1911.
1,092,339.
Patented Apr. 7, 1914.
2 SHEETS—SHEET 1.
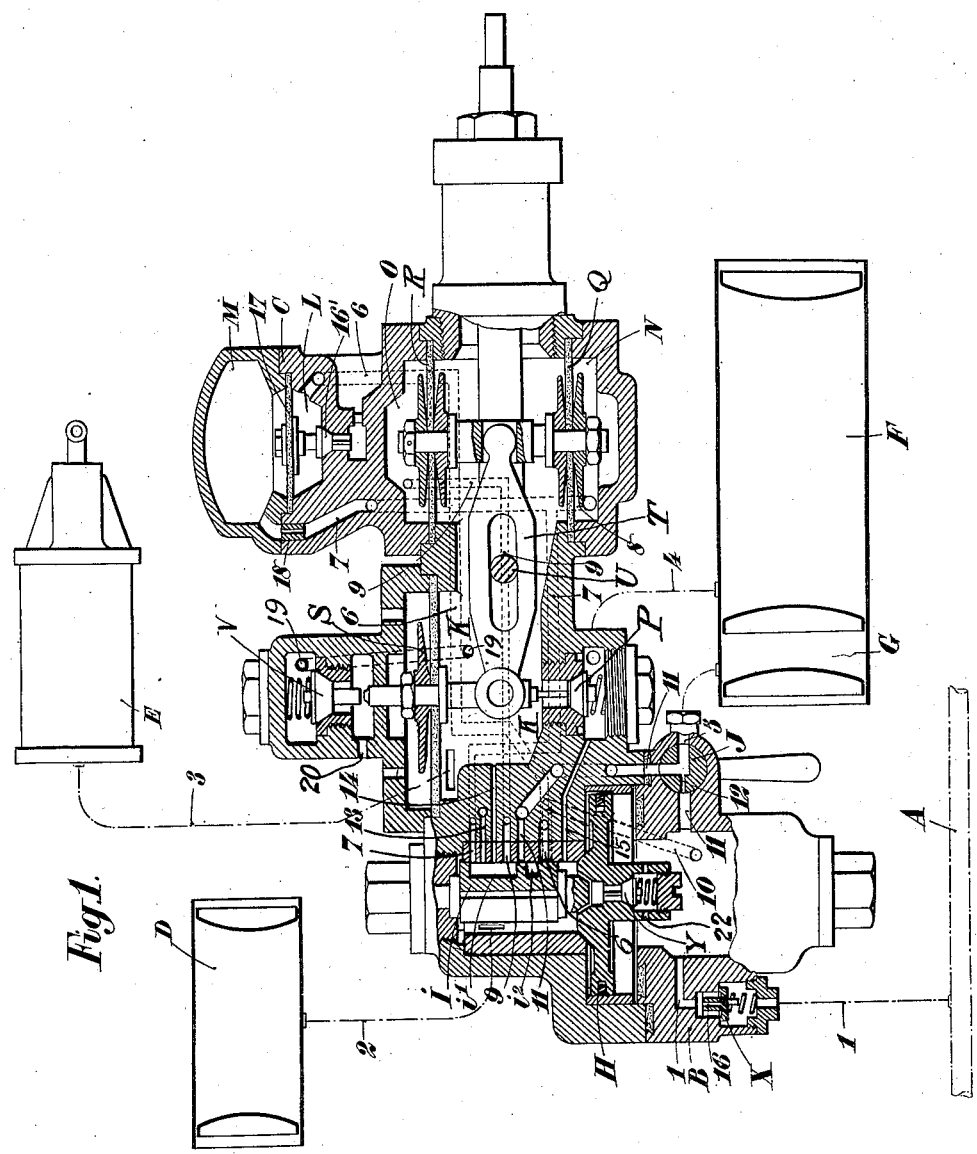

F. J. CHAPSAL & A. L. E. SAILLOT.
DEVICE FOR ACCELERATING THE APPLICATION OF PNEUMATIC BRAKES.
APPLICATION FILED JUNE 26, 1911.
1,092,339.
Patented Apr. 7, 1914.
2 SHEETS—SHEET 2.
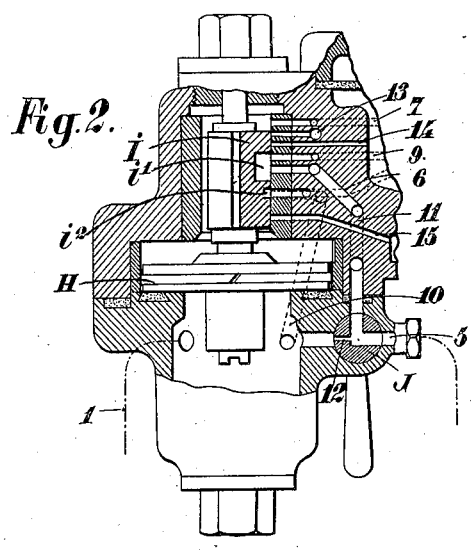
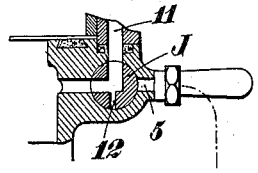
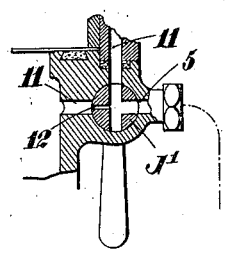
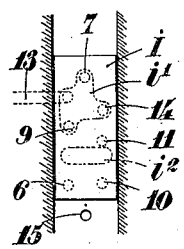
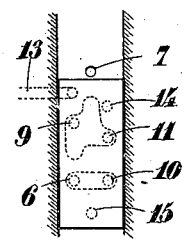
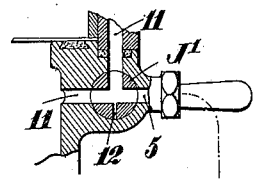
Witnesses.
Inventors.
COLUMBIA PLANOGRAPH CO., WASHINGTON, D. C.

UNITED STATES PATENT OFFICE.

FRANÇOIS JULES CHAPSAL AND ALFRED LOUIS EMILE SAILLOT, OF PARIS, FRANCE.

DEVICE FOR ACCELERATING THE APPLICATION OF PNEUMATIC BRAKES.

1,092,339. Specification of Letters Patent. Patented Apr. 7, 1914.

Application filed June 26, 1911. Serial No. 635,325.

*To all whom it may concern:*

Be it known that we, FRANÇOIS JULES CHAPSAL and ALFRED LOUIS EMILE SAILLOT, citizens of the French Republic, residing at Paris, Department of the Seine, in France, have invented certain new and useful Improvements in Devices for Accelerating the Application of Pneumatic Brakes; and we do hereby declare the following to be a full, clear, and exact description of the invention, such as will enable others skilled in the art to which it appertains to make and use the same.

The present invention relates to improvements in the distributer for the brake cylinder of the continuous pneumatic brake system described in our prior Patent, No. 929,551, of July 27, 1909; said improvements delaying the filling and evacuation of said cylinder in such a way as to permit of the application of the brakes on the wheels of the rear cars of long freight trains before braking and complete release of the brakes on the front cars has taken place.

In order to delay the filling and emptying of the brake cylinder, the moderating chamber O which communicates with the main conduit during the action of braking by means of the slide valve, is connected thereto by a passage 11 which comprises a restriction or throttling passage 12 and a branch conduit 5 leading to an air reservoir G the filling and emptying of which is done through said throttling passage 12. The capacity of the chamber O is thus increased by that of the air reservoir G. It follows from this fact that, when the brakes have been applied, the reduction in pressure in the chamber O is not as rapid as the reduction in the main conduit, for the throttling passage 12 delays the evacuation of the air from this chamber, the volume of which is obviously increased by said reservoir. The pressure in the chamber O will therefore be for some time higher than that in the main conduit and will decrease the rate of filling of the brake cylinder, said rate being proportional to the difference in pressure in the two chambers N and O.

The delay of the reduction in the chamber O being proportional to the cross-sectional area of the throttling passage 12 and to the capacity of the reservoir G, it will be understood that, by arranging their dimensions appropriately, it will be possible to delay the filling of the brake cylinder in such a way as to make the braking intensity on the wheels of the front cars of the train to be a given fraction (say ¼ or ⅕th) of the maximum braking intensity at the time when the brakes of the rear cars start operating. The violent reactions that unavoidably take place between the couplings when these long freight trains are stopped quickly, are thus minimized to a very great extent for the inequalities in braking between the front and rear cars are reduced to a quarter or a fifth of what they would be without the delay caused in filling the brake cylinder.

When releasing the brakes, the moderating chamber O is not refilled as quickly as the main conduit on account of the throttling passage 12, but is behind hand to that of the said conduit, this delay being augmented by the increase in volume of said chamber owing to its communication with the reservoir G. It follows from this that the refilling of the main conduit is more rapid than that of the chamber O which fact causes the start of the emptying of the brake cylinder of the rear cars before the emptying of the brake cylinder of the front cars has been completed. The special device which delays the filling of the brake cylinder in the manner hereinbefore described, therefore, also facilitates to release the brakes of long trains by releasing them slowly.

In the accompanying drawing:—Figure 1 is a longitudinal section of the Chapsal-Saillot distributer-accelerator, provided with the device forming the object of the invention, the brakes being released. Fig. 2 is a corresponding partial longitudinal section, the brakes being applied. Figs. 3 and 4 illustrate respectively the positions occupied by the slide valve of the distributer during running and during braking. Fig. 5 is a sectional view of a special three-way cock used on the device to which the invention relates. Figs. 6 and 7 represent a modification of this cock in two different positions.

In the general arrangement illustrated in Fig. 1, A is the main conduit or train pipe, B the distributer, C the accelerator, D the regulator reservoir, E the brake cylinder, F the braking reservoir and G the air reservoir.

The slide valve I of the distributer actuated by the piston H is provided with cavities $i^1$ and $i^2$ enabling the chambers M and O of the distributer-accelerator to be placed in communication with the atmosphere, or enabling chamber M to be placed in communication with the regulator reservoir D, chamber L in communication with the main conduit and chamber O in communication with the reservoir G. The reservoir of the distributer can be cut off at will by means of the cock J.

The main conduit A, the regulator reservoir D, and the brake cylinder E are respectively connected with the distributer by the conduits 1, 2 and 3.

The two chambers L and M of the accelerator are connected, in accordance with the description in our prior patent, respectively by the passages 6 and 7 with the valve seat of the slide valve I; a branch conduit 8 proceeding from the passage 7 places at the same time the chamber M in communication with the chamber N of the distributer. The chamber O of the distributer does not communicate with the chamber L of the accelerator; it is connected with the valve seat of the valve by means of a special passage 9. The chamber located beneath the piston H is also connected with the distributer valve seat by two passages 10 and 11. By means of the cock J, it is possible to interpose in this latter passage a throttling passage 12, (Figs. 1, 2 and 6) or to eliminate it (Figs. 5 and 7). In the first case, the cock places the passage 11 in free communication with the reservoir G through passage 5; and in the second case, (Fig. 5), communication between passage 11 and reservoir G is cut off.

In Fig. 7, which represents a constructional modification of the cock, the reservoir G remains in communication with the passage 11, but it is no longer separated from the main conduit by a throttling passage so that its effect is greatly lessened.

The passages 13, 14 and 15, place the distributing valve seat in communication with the atmosphere, the chamber K and the braking reservoir, respectively. The chamber K is connected directly to the brake cylinder by means of passage 3.

The device which regulates the distribution of air of the brake cylinder when braking and releasing consists of two valves P and V which regulate respectively the admission and exhaust of air and three diaphragms or pistons R, Q and S. This latter diaphragm is subjected on its upper face to the atmospheric pressure through orifices always open; on its inner face it is subjected to the pressure of the chamber K, i. e. of the brake cylinder which is connected by passage 3. The inner faces of the other two diaphragms R and Q are subjected to the pressure of the same chamber K; the upper face of the diaphragm R is subjected to the pressure of chamber O and the lower face of diaphragm Q to that of the chamber N. But as these diaphragms have both the same active surfaces, the effects of the pressure of the chamber K cancel each other and the two diaphragms will bend upward or downward according to whether the pressure in the chamber N is greater than the one in chamber O or not. Their motion is transmitted to the spindle of the diaphragm S by means of the lever T pivotally mounted at U. The spindle of the diaphragm S rests either on valves P or V according to the direction of motion imparted to it by the conjugated bending of the two diaphragms R and Q which in turn depend, as heretofore explained, on the difference of the pressures existing in chambers N and O. The motion of said lever T is stopped by the action of the air in the chamber K which acts on the underside of the diaphragm S. This action balances by the intermediary of the lever T the difference in pressures in the chambers N and O. In short, it is this difference in pressures in the two chambers N and O that regulates the distribution of air to the brake cylinder, for admission as well as exhaust. The greater this difference is the greater will be the pressure of the air admitted to the brake cylinder. If this difference diminishes, the pressure in the brake cylinder diminishes through evacuation to the exterior. If this difference is rapidly established, the filling of the brake cylinder will also be done rapidly and finally. If on the contrary the difference is slowly made, the filling will also be slowly done.

During running with the brakes released (Figs. 1 and 3) the air in the conduit A arriving through the passage 1, lifts the piston H and passes through a small orifice in this piston to supply air to the reservoir D through 2 and to the reservoir F through 15 and 4. Air will also be supplied to reservoir G through conduit 11, throttling passage 12 and conduit 5.

The cavity $i^1$ of the slide valve I places the passages 7, 9 and 14 in communication with the atmosphere through the passage 13, said passages communicating respectively with the chambers M, N, O and K of the distributer accelerator and with the brake cylinder E; the orifices of the passages 6, 10 and 11 being closed. The chamber L not obtaining any more air from the conduit cannot retain compressed air, for the chamber M being empty, the little compressed air contained in chamber L will escape by lifting the diaphragm 17 of the accelerator and the exhaust valve 16'.

As soon as the engineer desiring to apply the brakes, has let escape, by means of his control valve, a quantity of air from the main conduit sufficient to lower the piston H, the slide valve I will place on one hand the main conduit A in direct and rapid communication with the chamber L by means of the passages 6 and 10 (Fig. 4) and it will on the other hand, establish a slow communication between the reservoir D and the chamber M through the conduit 7 containing the throttling passage 18 and a rapid communication with the chamber N through the shunt conduit 8. It follows that the diaphragm 17 separating the chambers L and M will at once be lifted and the valve 16' will exhaust air from the main conduit until the pressure of the air of the regulator reservoir which is slowly introduced into the chamber M, is sufficient to lower the diaphragm 17 and to close the valve 16'. This new drop in pressure will evidently be gradually transmitted to the rear of the train. The lowering of the slide valve I also effects the connection of the passage 9 to the passage 11 through the cavity $i^1$; therefore, the reservoir G will exhaust its air into the chamber O. But, as the passage connecting said reservoir with the main conduit contains a throttling passage 12, the reduction in pressure in said conduit is only but slowly being felt in said reservoir. Finally, the reduction in pressure caused by the operation of the accelerator is transmitted only slowly and greatly lessened to the chamber O. The same would occur even if the reduction in pressure were very sudden such as in the case of the coupling members being disconnected.

The chamber N receiving air from the reservoir D is filled at a higher pressure than the chamber O and, consequently, the two diaphragms Q and R are conjointly but slowly lifted. The lifting of the diaphragms would be much more rapid if the pressure in the chamber O dropped at the same rate as in the main conduit. The spindle carried by diaphragms Q and R oscillates the lever T around the axis U. The other end of the said lever rests on the valve P and the air from the brake reservoir F flows into the chamber K and from here into the brake cylinder until the pressure thus admitted into said chamber acting on the underside of the diaphragm S which is subjected to an atmospheric pressure on its upper side, is sufficient to return the lever to its normal position and to shut the valve P.

It is clear that the intensity of braking is proportional to the difference in pressures existing between the chambers N and O and that the rapidity of increase in pressure in chamber K, i. e. in the brake cylinder, is regulated by the rapidity of reduction in pressure in chamber O.

The reservoir G exhausting at the beginning of the operation highly compressed air in to the chamber O, interposes itself between said chamber and the main conduit and produces a slackening in braking which can be made as gentle as desired by varying either the capacity of said reservoir or the cross-sectional area of the throttling passage 12. A slow braking under each car is obtained together with a rapid propagation of braking all along the train to such an extent that before the brakes on the front cars are fully applied, the propagation has reached the last one and the stopping of the train is done more smoothly and uniformly.

When the pressure has been reëstablished in the main conduit at the time of releasing the brakes, the throttling passage 12 breaks the filling wave and the reservoir G absorbs what is left; they still interfere so as to prevent a sudden admission of air in the chamber O and to lessen the effects of a sudden operation, but they do not impede the passage of the compressed air through the main conduit to the following cars to cause progressive releases everywhere at practically the same time. The pressure admitted in the chamber O during release also coöperates in regulating the release of the brakes because the pressure in the chamber N remains the same; if the pressure in O increases the difference which existed between the two chambers, diminishes.

It will be noted that the piston H starts its upward movement only when the pressure on its under side exceeds that on its upper side or that supplied by reservoir D. An increase in the train pipe pressure may therefore fill the chamber O through passages 11 and 9 without moving the piston H. During this time, the chamber N is in constant communication with reservoir D, and as the pressure in chamber O has been increased, the difference in pressure which is exhausted between chambers O and N has been reduced. Obviously, any pressure admitted to chamber O, when the pressure in N remains the same, facilitates release of the brakes. Further, if the pressure in the chamber O increases which occurs when the main conduit has a fresh supply, it will destroy the equilibrium maintaining the three diaphragms Q, R and S in a stable position; the former two will bend downward and turn the lever T in clockwise direction which will lift the valve V. Said valve permits the escape of the air in chamber K to the exterior through passages 19 and 20. Release of brakes therefore takes place, but this release is gradual and partial, it being limited by the quantity of air admitted to the chamber O. The movement of the lever T and the valve V is closely connected with the rapidity of the filling of the chamber O.

It will be clearly seen from the foregoing that if the filling of the said chamber is slow, the lift of the valve V will be very small and the release of the brakes will also be done slowly. The release can be done as gently and as slowly as desired by increasing the capacity of the reservoir G which is always interposed between the main conduit and the chamber O during braking or, by reducing the cross sectional area of the throttling passage 12.

The chamber G and the throttling passage 12 can be employed either separately or simultaneously which permits of modifying at will the duration of the filling and evacuation of the brake cylinder. This duration which it would be advantageous to lengthen in the case of long freight trains should be much shorter in the case of passenger trains. But as the same cars may have to enter indiscriminately into the composition of freight and passenger trains, it is possible by merely operating the cock J, to cut off or to cut in the chamber G and the throttling passage 12. In Figs. 1 and 2, the cock is arranged for freight trains, its lever being vertical; in Fig. 5 it is horizontal, which position corresponds to its use on passenger trains.

Figs. 6 and 7 represent a modification of this cock; in Fig. 6, (freight trains) both the air reservoir and the throttling passage are in use; in Fig. 7, the throttling passage is left out but the air reservoir remains in communication with the chamber O and retains a certain moderating action.

A valve Y is mounted on the underside of the piston N and kept on its seat by means of a spring which can be regulated at will. This valve, already described in our prior Patent No. 929,551, regulates through passages 21 and 22, the communication between the space above and the space below the piston H, i. e. between the main conduit and the regulator reservoir. If the reduction in pressure in the main conduit exceeds that which is necessary for a complete application of the brakes, the valve Y will be lifted and the air from the regulator reservoir returned to the main conduit. The tension of the spring holding the valve Y seated is so regulated that it will permit of sufficient difference of pressure above and below the piston to allow the pressure above said piston to lower the same when the train pipe pressure is reduced, and to allow sufficient pressure to be exerted on the top of the piston during release, so that a slight increase of train pipe pressure will fill the chamber O without moving the piston, as heretofore explained. A diminution in pressure in the chamber N follows when the valve Y is opened by an excessive reduction in the train pipe, the air escaping through the shunt conduit 8 and the passage 7 uncovered by the slide valve, (Fig. 4). At the same time the reservoir G fills the chamber O which is subsequently slowly exhausted to retard braking, so that by coöperation of the reservoir G and the valve Y, a delay in braking is obtained. The foregoing is what occurs under the front cars of long trains when the engineer's operating valve has been suddenly actuated such as in emergency cases.

The reduction produced in the main conduit by the driver's operating valve is sudden at the head of the train and becomes delayed and lessened when reaching the rear cars so that the valves Y of the rear part of the train will only open slowly and very little.

The transfer of air between the regulator reservoirs and the main conduit which takes place very rapidly at the head of the train is slow in the rear, and the chambers N of the distributers in the rear exhaust more slowly than those in front so that the rear part brakes normally without any initial delay as soon as the drop in pressure in the main conduit is felt.

By the coöperation of the valve Y with the reservoir G with its throttling passage 12, a delay in braking on the front cars and a lengthened duration of filling the brake cylinder are obtained while in the rear there is no delay in braking and the curve of filling is more rapid. The maximum pressure in the cylinder at the head and in the rear of the train is obtained practically in the same time. Finally the combination of the two devices permits of a uniform braking all along the train.

The arrangement shown lends itself to other combinations of the cock and the air reservoir; the latter could be placed anywhere else, say below a three way cock. The said reservoir could also be mounted directly on the passage 11 and so eliminate the shunt passage 5.

What we claim is:—

1. In a distributer accelerator for pneumatic brakes, a brake cylinder, a moderating chamber, valve mechanism to control the pressure in the brake cylinder, connections between said moderating chamber and said valve mechanism whereby a pressure in said moderating chamber tends to oppose the application of the brakes, means to supply air under pressure to said moderating chamber and means to release said pressure gradually thereby retarding the application of the brakes.

2. In a distributer accelerator for pneumatic brakes, a brake cylinder, a moderating chamber, valve mechanism to control the pressure in the brake cylinder, connections between said moderating chamber and said valve mechanism whereby a pressure in said moderating chamber tends to oppose the application of the brakes, a compressed air reservoir, means to place said reservoir in communication with the moderating chamber and means to permit the compressed air to escape gradually from said reservoir.

3. In a distributer accelerator for pneumatic brakes, a brake cylinder, a moderating chamber, valve mechanism to control the pressure in the brake cylinder, connections between said moderating chamber and said valve mechanism whereby a pressure in said moderating chamber tends to oppose the application of the brakes, a compressed air reservoir, means to place said reservoir in communication with the moderating chamber and means comprising a restricted passage to permit a gradual escape of air from said reservoir and said moderating chamber.

4. In a distributer accelerator for pneumatic brakes, a brake cylinder, a moderating chamber, valve mechanism to control the pressure in the brake cylinder, connections between said moderating chamber and said valve mechanism whereby a pressure in said moderating chamber tends to oppose the application of the brakes, a compressed air reservoir in communication with the train pipe when the brakes are released, valve mechanism actuated by the reduction of pressure in the train pipe to place said moderating chamber in communication with the air reservoir and means to permit a gradual escape of air from said air reservoir when the reduction of pressure takes place in the train pipe.

5. In a distributer accelerator for pneumatic brakes, a brake cylinder, a moderating chamber, valve mechanism to control the pressure in the brake cylinder, connections between said moderating chamber and said valve mechanism whereby a pressure in said moderating chamber tends to oppose the application of the brakes, a compressed air reservoir in communication with the train pipe by means of a restricted passage, valve mechanism actuated by the reduction of pressure in the train pipe to place said reservoir in communication with the moderating chamber, said restricted passage permitting of a slow escape of compressed air from the air reservoir, thereby allowing the brakes to be gradually applied, said restricted passage also serving to admit compressed air to the moderating chamber slowly to gradually release the brakes when the pressure in the train pipe is increased.

In testimony whereof we affix our signatures in presence of two witnesses.

FRANÇOIS JULES CHAPSAL.
ALFRED LOUIS EMILE SAILLOT.

Witnesses for François Jules Chapsal:
CHARLES ROY NASMITH,
JOSEPH DARNET.
Witnesses for Alfred Louis Emile Saillot:
H. O. COXE,
LOUIS JONES.

---

Copies of this patent may be obtained for five cents each, by addressing the "Commissioner of Patents, Washington, D. C."